(12) United States Patent
Lim et al.

(10) Patent No.: US 9,661,549 B2
(45) Date of Patent: May 23, 2017

(54) NODE OF AN IMPROVED MULTIHOP AD-HOC RADIO NETWORK AND ASSOCIATED METHOD

(71) Applicant: THALES, Neuilly sur Seine (FR)

(72) Inventors: David Lim, Gennevilliers (FR); Pascale Fouillot, Saint-Mande (FR); Vania Conan, Paris (FR); Damien Lavaux, Gennevilliers (FR); Didier Pirez, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 254 days.

(21) Appl. No.: 14/554,294

(22) Filed: Nov. 26, 2014

(65) Prior Publication Data

US 2015/0146534 A1 May 28, 2015

(30) Foreign Application Priority Data

Nov. 28, 2013 (FR) ...................................... 13 02758

(51) Int. Cl.
*H04L 12/18* (2006.01)
*H04H 20/10* (2008.01)
*H04H 20/28* (2008.01)
*H04J 3/02* (2006.01)
*H04W 40/02* (2009.01)
(Continued)

(52) U.S. Cl.
CPC .......... *H04W 40/023* (2013.01); *H04L 69/22* (2013.01); *H04W 4/06* (2013.01); *H04W 84/18* (2013.01)

(58) Field of Classification Search
None
See application file for complete search history.

(56) References Cited

U.S. PATENT DOCUMENTS

2011/0199953 A1\* 8/2011 Seok ....................... H04W 4/06
370/312
2012/0087351 A1 4/2012 Fouillot et al.
(Continued)

FOREIGN PATENT DOCUMENTS

EP 2 440 001 A1 4/2012

OTHER PUBLICATIONS

Chen Zhiliang et al: "Reducing aggregation Bias and time in a gossiping-based wireless sensor networks", 2013 IEEE 14th Workshop on Signal Processing Advances in Wireless Communications (SPAWC), IEEE, Jun. 16, 2013, pp. 165-169.
(Continued)

*Primary Examiner* — Alpus H Hsu
*Assistant Examiner* — Camquyen Thai
(74) *Attorney, Agent, or Firm* — Davidson, Davidson and Kappel, LLC

(57) ABSTRACT

This node, applying an information broadcasting service of the flooding type, includes a controller for accessing the radio resource able to perform dynamic containment for accessing the radio resource. It is characterized in that it includes a network coder allowing generation of the data packets so that each packet includes, in the payload portion, a message (M) resulting from the combination of a plurality of pieces of information ($Info\_id_i$) to be broadcast, and in the header portion, a list (L) of the identifiers ($Id_k$) of the pieces of information combined in the message.

8 Claims, 3 Drawing Sheets

(51) Int. Cl.
*H04L 29/06* (2006.01)
*H04W 4/06* (2009.01)
*H04W 84/18* (2009.01)

(56) References Cited

U.S. PATENT DOCUMENTS

| 2012/0307934 | A1* | 12/2012 | Heidari | H04L 1/0003 |
| | | | | 375/295 |
| 2012/0320759 | A1* | 12/2012 | Shao | H04W 24/02 |
| | | | | 370/242 |
| 2013/0110462 | A1 | 5/2013 | Lovitt | |
| 2013/0208622 | A1* | 8/2013 | Ibuki | H04W 84/18 |
| | | | | 370/254 |

OTHER PUBLICATIONS

Zubairi J A et al: "Ambulatory data aggregation and reduction for transmission over limited bandwidth network", Collaborative Technologies and Systems, 2009. CTS '09. International Symposium on, IEEE, Piscataway, NJ, USA, (May 18, 2009), pp. 356-360.

Hongqiang Zhai et al: "A Distributed Packet Concatenation Scheme for Sensor and Ad Hoc Networks", Military Communications Conference, 2005. MILCOM 2885. IEEE Atlantic City, NJ, USA Oct. 17-28, 2885, Piscataway, NJ, USA,IEEE, Piscataway, NJ, USA, Oct. 17, 2005 (Oct. 17, 2005), pp. 1-7.

* cited by examiner

NODE OF AN IMPROVED MULTIHOP AD-HOC RADIO NETWORK AND ASSOCIATED METHOD

This claims the benefit of French Patent Application FR 1302758, filed Nov. 28, 2013 and hereby incorporated by reference herein.

The field of the invention is that of multihop ad-hoc radio networks. More particularly, the field of the invention is that of a mobile and high density multihop ad-hoc radio networks.

BACKGROUND

In mobile multihop ad-hoc radio networks, connectivity considerably varies in time and in space. By connectivity, is meant the possibility of a node of accessing the radio resource in order to transmit, without any perturbation, a signal and the possibility of the other nodes of accessing the resource at the same instant for receiving the transmitted signal.

These problems are exacerbated in a case of a strong node density.

Among ad-hoc radio networks, networks applying a routing protocol are known.

However in order to maintain a view of the topology of the network at each instant, these networks require constant updating of the mapping of the topology, as well as a propagation of the corresponding pieces of information through the network by means of suitable signaling packets. For high density networks, maintaining such a mapping becomes extremely difficult and complicated to apply. The signaling packets further limit connectivity.

Ad-hoc radio networks are also known which not require any routing protocol. These are multi-hop ad-hoc radio networks applying a broadcasting service of the flooding type.

Generally in an ad-hoc radio network, each node may act not only as a transmitter or receiver of a data packet, but also as a relay for a data packet between the transmitter and the addressee.

In this context, various services for broadcasting data packets may be applied.

A simple-to-apply broadcasting service is a service of a flooding type, wherein a transmitter wishes to exchange data with an addressee, transmits a message including the datum towards the whole of his neighbors, i.e. the whole of the nodes within the radio which of the transmitter. In turn, each neighboring node, acting as a relay, transmits a message including this datum to the whole of its neighbors. Step by step, the datum is broadcast into the whole network. It ends inter alia by reaching the desired addressee.

However, in the case of a high density ad-hoc radio network, a broadcasting service of the flooding type, in which everybody transmits to everybody, is not suitable because of the large number of packets transmitted and retransmitted by the different nodes for broadcasting a single datum. Therefore there is a high probability of a collision of the signals and degradation of the connectivity.

For a mobile and high density multihop ad-hoc radio network, document EP 2 440 001 A1, incorporated by reference, discloses a node including a control means for accessing the radio resource (MAC according to the acronym "Medium Access Control") applying a dynamic containment method for accessing the resources.

More specifically, the various nodes of the network are synchronized. The access to the radio resource is subdivided into time frames. A node is allowed to access the resource every Q frames. The period Q is variable and its value is dynamically adapted according to the use of the resource made by the relevant node and its neighbors. Further, a frame is subdivided into a plurality of time slots. In an authorized frame, a node is able to randomly select the slot in which it transmits a data packet.

Thus, in document EP 2 440 001 A1, each node is able to estimate the number of neighboring nodes V depending on the number of collisions detected in the different slots of a plurality of successive frames. When the estimated number of neighbors V increases, the node asks its neighbors to increase their transmission periods Q.

However, in high density ad-hoc radio networks applying a broadcasting service of a flooding type, the application of a network for containment of packets may not be sufficient.

SUMMARY OF THE INVENTION

An object of the invention is to overcome this problem.

The present invention provides a node of a multi-hop ad-hoc radio network and a method for broadcasting information in a multi-hop ad-hoc radio network according to the claims.

Generally, a node N includes a broadcasting device associating a control means for accessing the resource of the dynamic containment type and a network coding means.

A transmitting node wishes to broadcast information to the whole of nodes of the network.

Network coding consists of combining together the different pieces of information to be broadcast. The message resulting from this coding operation is broadcast on the network.

Upon reception, a node receiving this message attempts to decode it in order to get back to the pieces of information of which it is the combination. This decoding operation is carried out by means of the information which the received node already has, at this instant when making use of the network. A message is deemed to be useful when it allows the relevant receiving node to improve the number of the pieces of information which it has.

On transmission, a node generates a new message from all or only part of the information which it has at this instant.

The network coding methods thus appear as cooperative transmission methods wherein each node acts as a source of a piece of information and/or as a node for encoding pieces of information. It is shown that network coding gives the possibility of saving on the number of transmissions over the network, required for broadcasting a group of pieces of information. Accordingly, network coding is a method allowing optimization of the consumption of the radio bandpass.

In the embodiment presently contemplated, the network coding algorithm applied by a node produces a random linear combination of pieces of information. The algorithm gives the possibility of generating a message by randomly selecting n pieces of information in a maintained information table updated by the node. The algorithm performs a binary operation between the bits of the selected pieces of information, such as an "exclusive OR".

As a document of the state of the art relating to network coding, mention will be made of the articles of C. Fragouli et al. «a network coding approach to energy efficiency broadcasting» published in 2006.

BRIEF DESCRIPTION OF THE DRAWINGS

The invention and advantages thereof will be better understood upon reading the description which follows, only given as an illustrative and non-limiting example, and made with reference to the appended drawings wherein.

DETAILED DESCRIPTION

Figure 1:
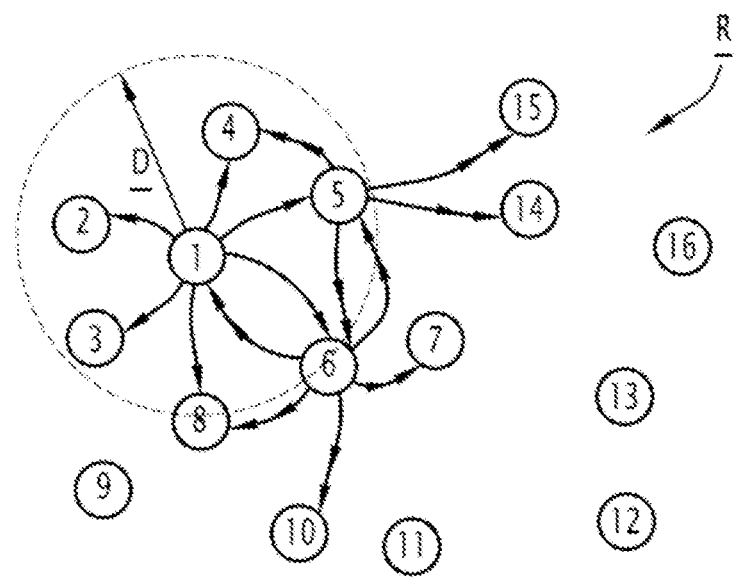
FIG. 1 is an illustration of a high density multihop ad-hoc radio network.

FIG. 1 illustrates a network R which is a strong density ad-hoc radio network in which a broadcasting service of a flooding type is applied.

The network R includes 16 nodes, respectively identified by an integer i between 1 and 16.

The node 1 wishes to exchange a datum with the node 12.

The node 1 transmits a first packet including the datum. This packet reaches the different nodes located within radio range of the node 1. The radio range is schematically illustrated by a circle of radius p0. The nodes 2-16 receive the first packet.

In a second phase, each node 2-16 transmits a second packet including the received datum. This second packet reaches the different nodes located within radio range of the nodes 2-6.

Step by step, the datum reaches the node 12. The node 12 may receive several times the same datum via different intermediate nodes.

Figure 3:
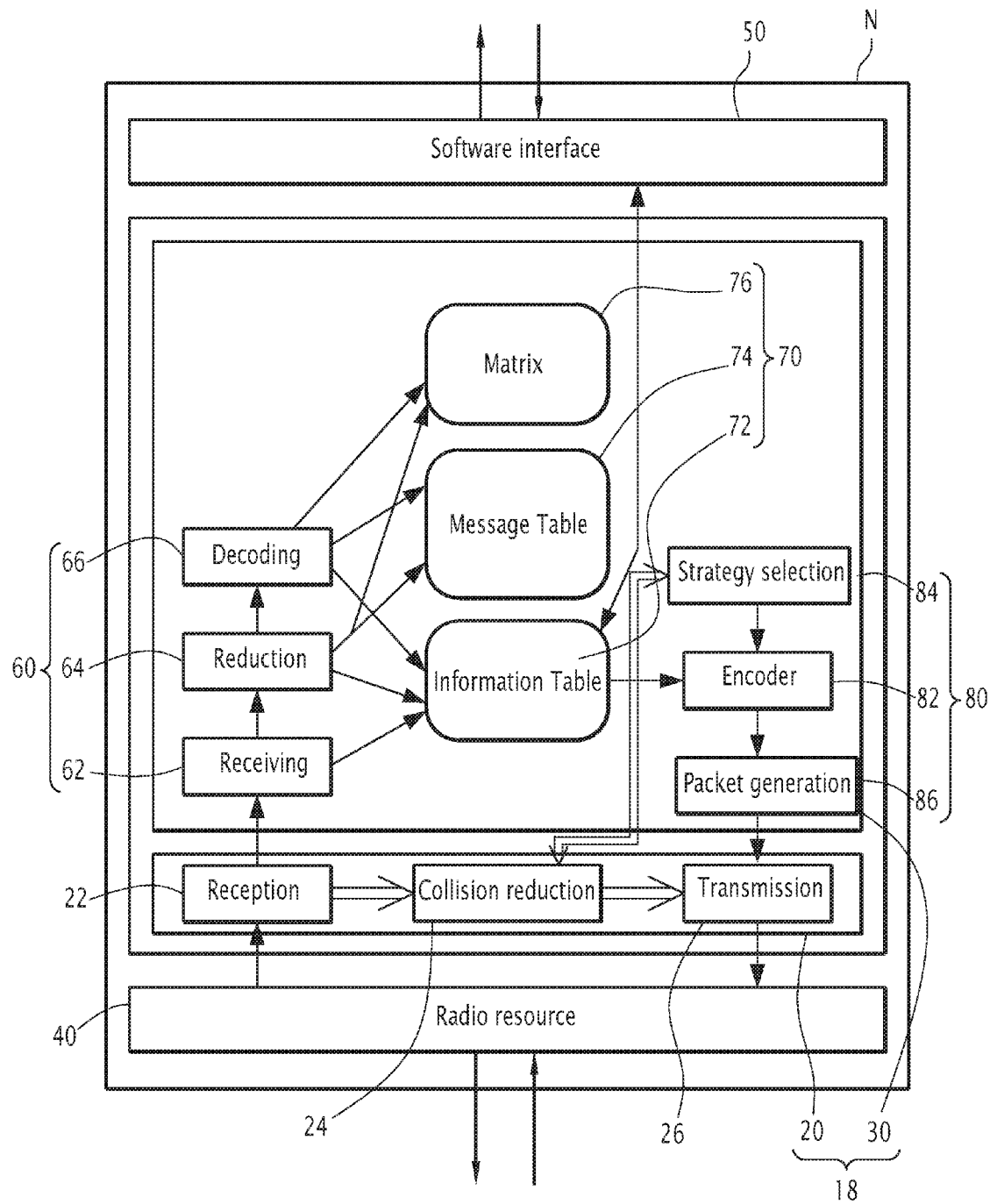
FIG. 3 is a schematic illustration as blocks of a node of network of FIG. 1 including an improved broadcasting device.

With reference to FIG. 3, a node N will now be described in detail.

A node is for example a computer including a computing means, such as a processor; a memory storage means, such as a random access and/or read-only memory; means for transmitting/receiving radio signals; and an input/output interface allowing another computer connected to the node to access the network.

The memory of the node N includes instructions of a computer program called a communication driver. These instructions are intended to be executed by the computing means so as to allow an application for example running on the other computer connected to the node, to communicate data on the network.

In particular, the execution of this driver gives the possibility of providing a node N with a broadcasting device 18.

As illustrated in FIG. 3, the broadcasting device (or drivers 18 is at the interface between the means 40 for transmitting/receiving radio signals and a software interface means 50 allowing exchange of information with the other computer connected to the node N.

The broadcasting device 18 includes a control means for accessing the resource, a so-called MAC means 20 in the following, and a network coding means 30.

The MAC means 20 is able to apply a method for accessing the resource by dynamic containment, according to the one described in document EP 2 440 001 A1.

The MAC means 20 includes a module for receiving data packets from the means 40 for transmitting/receiving radio signals. This module is referenced by number 22 in FIG. 1. The receiving module 22 is able to extract the data contained in an incident packet (header and payload) and to transmit them by means of network coding 30.

The receiving module 22 is also able to extract parameters relating to the operation of the physical layer and to the quality of the packets received in the different time slots of the frames (packet collision, legible packet, etc.)

The MAC means 20 includes a collision reduction module 24. The module 24 is able to collect the parameters delivered by the receiving module 22 and to apply the method described in document EP 2 440 001 A1, in order to compute the transmission period Q for node N. This computation passes by estimating a number of neighboring nodes V.

The collision reduction module 24 is able to control the network coding means 30 and to pass on to it operating parameters such as a number of neighboring nodes V.

Advantageously, after having controlled the activation of the network coding means 30, the module 24 is able to receive from the module 30 parameters associated with the network coding mechanisms used. These are for example, the dimension of the field used for the coding algorithm, the threshold on the number of hops beyond which a piece of information is no longer propagated, or any other piece of information characterizing the network coding mechanism.

The module 24 is then able to take these parameters into account in the computation of the transmission period Q, This allows in particular the module 24 to perform a computation of Q, different according to whether the information to be transmitted on the network stems from coding or not. Indeed other communication services of the node N may use the MAC means 20, and in particular the transmission module 26: a point-to-point communication service, or else a point-to-multipoint communication service for example, which do not involve any processing by the module 30.

The MAC means 20 includes a transmission module 26 able to be called upon by the collision reduction module 24 at the beginning of the frame in which the node N is allowed to transmit.

The module 26 receives from the network coding means 30, a packet to be transmitted. The module 26 is able to randomly select the slot of the frame in which a packet may be transmitted. The module 26 passes on the packet to the means 40 for transmitting/receiving the radio signal so that the packet is transmitted in the allowed frame and the selected slot.

The network coding means 30 includes a receiving stage 60, a storage stage 70 and a transmission stage 80.

The storage stage 70 includes an information table 72, a table of messages 74 and a matrix 76.

The information table 72 includes a first field for identifying each of the nodes of the network and a second information field including, when the relevant node N has not yet been able to decode the piece of information generated by the node corresponding to zero information, and when the relevant node N has succeeded in decoding the piece of information generated by the corresponding node, the decoded information.

The table of messages 74 includes at line k a message Mk resulting from the combination of the pieces of information generated by the nodes of a list Lk.

Finally, the matrix 76 includes as many columns as there are nodes in the network 16. Line k of the matrix 76 includes, in the form of zeroes and ones, the list Lk of the nodes for which the pieces of information have been combined for constructing the message Mk of the table of messages 74.

The receiving stage 60 includes a receiving module 62, a matrix reduction module 64 and a decoding module 66.

The receiving stage 60 includes a receiving module 62, a decoding module 64 and a matrix reduction module 66.

The receiving module 62 receives a packet P from the module 22 of the MAC means 20.

Figure 2:
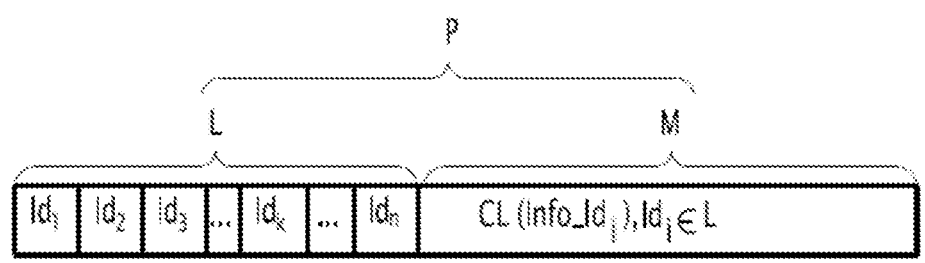
FIG. 2 shows a structure of a data packet exchanged on the network of FIG. 1.

The module 62 is able to read in the header of the packet P, the list L of the identifiers Idk of the nodes for which the Infok pieces of information are combined in the message M contained in the useful payload portion of the packet P (FIG. 2).

When the list L includes a single identifier, this means that the message corresponds to a single piece of information. The module 62 is able to directly store this information in the table of information 72, at the line corresponding to the node identified in the list L.

On the other hand, if the list L includes several identifiers, this means that the message M results from the combination of several pieces of information. The module 62 stores the message M in a new line k of the table of messages 74 and adds a new line k to the matrix 76. This new line consists of "0s" for each node for which the identifier does not appear in the list L and of "1s" for each node for which the identifier appears in the list L.

The module 62 is then able to call upon the matrix reduction module 64.

The module 64 allows reduction of the matrix 76 and accordingly simplification of the table of messages 74.

The module 64 is then able to call upon the decoding module 66.

The decoding module 66 applies a decoding algorithm giving the possibility of solving all or part of the system of k equations with N unknowns formed by the matrix 76 and the table of messages 74.

If, at the end of the decoding, new pieces of information are isolated, the module 66 is able to store the latter in the information table 72.

The transmission stage 80 includes an encoder 82, a strategy selection module 84 and a packet generation module 86.

The encoder 82 is able to select n pieces of non-zero information in the table of pieces of information 72. The encoder 82 then generates a message M by performing a linear combination of the selected pieces of information. An "exclusive or" (XOR) operator is for example used on the pieces of information, in binary form.

The strategy selection module 84 is able to call upon the encoder 82 by passing on to it a series of variables.

The module 84 gives the possibility of indicating the value of the number n of pieces of information to be combined in the message M. For example, when the density of neighboring nodes decreases, the module 84 assigns the value 5 to the variable n and when the density of neighboring nodes increases, the module 84 assigns the value 10 to the variable n. It should be noted that the current value of the variable n cannot be greater than the number of pieces of information contained in the information table 72 at the current instant.

The module 84 selects how the encoder 82 selects the pieces of information. For example, in the «random» selection mode, the encoder randomly selects n pieces of information in the table of pieces of information 72.

The strategy module 84 is driven by the collision reduction module 24 of the MAC means 20. The module 24 is able to estimate the number V of nodes found in its vicinity.

When this estimated number of neighboring nodes V increases, the module 24 increases the transmission period Q separating two frames during which the transmission module 26 is allowed to transmit a packet. It should be emphasized that the module 24 also informs the neighboring nodes on the value of the computed period Q so that they adapt the value of their transmission period. To do this, the module 24 controls the transmission module 26 so that it transmits suitable service messages.

When this estimated number of neighboring nodes V increases and for example exceeds a first number V1, the module 24 is able to request encoding of the pieces of information to be broadcast. The module 24 awaits the strategy selection module 84 which, in turn calls upon the encoder 82.

Preferably, the module 24 is able to communicate to the strategy module 84 the estimated number of neighboring nodes V.

Advantageously, after having controlled the coding of the pieces of information, the module 24 takes parameters into account which are provided to it by the module 30. These parameters for example deal with the properties associated with the network coding mechanisms, such as the coding type, the dimension of the field used, the threshold on the number of hops, or any other information characterizing the network coding mechanism.

The strategy module 84 is then able, from the value of the estimated number of neighboring nodes V, to define the operating variables of the encoder 82. For example, the module 84 determines that the number n of pieces of information to be encoded should pass from 5 to 10.

Finally, the packet generation module 86 of the transmission stage 80 is able to generate a packet from the message M obtained at the output of the encoder 82 and from the identifiers of the nodes, sources of the pieces of information combined in this message. The module 86 elaborates a packet according to the protocol illustrated in FIG. 2.

The packet generation module 86 places the packet in a buffer memory which the transmission module 26 of the MAC means 20 is able to read, with view to the next transmission.

Figure 4:
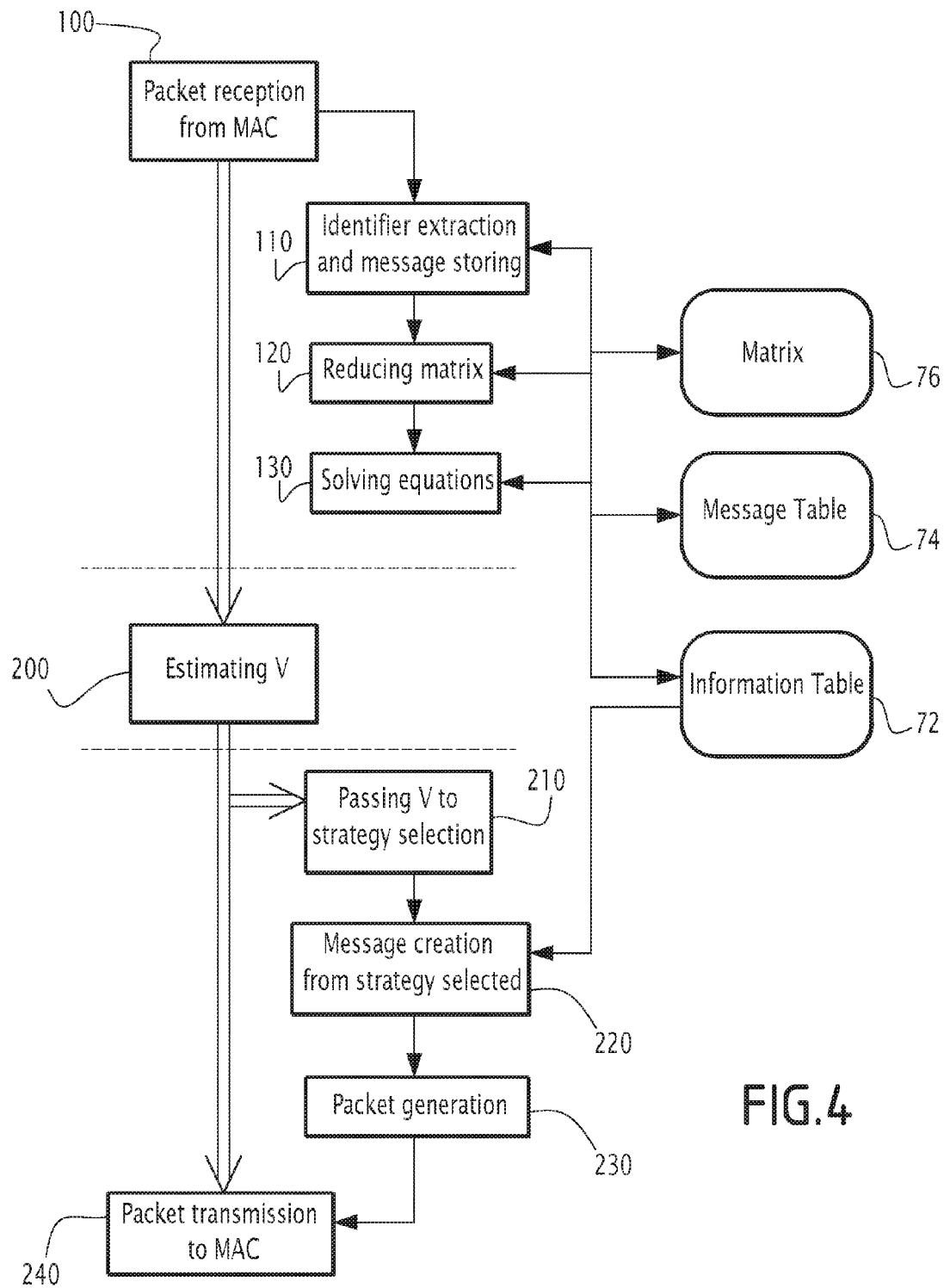
FIG. 4 is a schematic illustration of the broadcasting method applied by the service of the node of FIG. 3.

As illustrated by FIG. 4, the operating method of the broadcasting device 18 is the following.

On the network R, the broadcasting service operates with a period for generating information. A service for synchronizing the nodes of the network gives the possibility of defining a common instant at the beginning of a period for generating pieces of information and a common instant of the end of a generation period. At the beginning of each generation period, each node of the network R wishes to broadcast a single piece of information for which it is the source.

The broadcasting service only transmits pieces of information belonging to the current generation period. Upon passing from one generation period to the next, the data stored in the memory storage stage 70 of each node of the network R are reset. In particular, the pieces of information of the information table 72 are discarded.

For the node N, in an operating receiving phase, in step 100, a packet Pk is recovered by the module 22 of the MAC means 20. The index k corresponds to the receiving order of the packets from the beginning of the current generation period. The packet Pk is applied at the input of the receiving module 62 of the network coding means 30.

In step 110, the module 82 binds the header of the Pk packet and the list Lk of the identifiers of the nodes, sources of the coded information in message Mk, contained in the useful payload portion of the packet Pk.

If the list Lk only includes one identifier j, this means that the message Mk corresponds to a single piece of information Info j, transmitted by the source node j. The information Info_is directly stored in the information table 72, at the line j associated with the identifier of the source node j.

On the other hand, if the list Lk includes several identifiers j, the message Mk is stored in memory at line k of the message table 74, while the list Lk is stored in memory at line k of the matrix 76.

Next, the module 62 launches execution of the matrix reduction module 64.

In step 120, the reduction module 64, from the pieces of information presently appearing in the information table 72, attempts to reduce at most the matrix 76.

The combinations affecting the lines of the matrix 76 are passed on to the lines of the table of messages 74.

The module 64 then launches the decoding module 66.

In step 130, the decoding module 66 is executed in order to attempt to solve all or part of the system of equations defined by the matrix 76 and the table of messages 74.

If this leads to extraction of new pieces of information Info j, the latter are stored in the information table 72.

Thus, during gradual reception of the packets, the information table 72 is gradually completed. However, it is not certain that at the instant of the end of the current generation period, the information table 72 is entirely completed. However, the pieces of information present may be sufficient for operating the computer connected to the node N.

In parallel, the reception module 22 of the MAC means 20, collects parameters relating to the use of the radio resource and transmits them to the collision reduction module 24.

In an intermediate step 200, the module 24 estimates the number of neighboring nodes V. By computing the period Q, it defines the next frame in which the node N will be allowed to transmit a packet.

Next, during a transmission phase, the module 24 decides to resort to network coding of the messages to be broadcast, so as to reduce the number of packets to be transmitted and therefore the number of collisions.

In step 210, the collision reduction module 24 calls upon the strategy module 84 by passing on to it the estimated number of neighboring nodes V.

The strategy module 84 thereby awaken launches execution of the encoder 82 by passing on operating variables to it. For example, the module 84 indicates to the module 82 that it has to operate in a random mode, by combining 10 pieces of information.

In step 220, the encoder 82 consults the information table 72 and randomly selects therefrom, 10 pieces of non-zero information, Info_m. The selected pieces of information are combined by means of an operation of the "exclusive OR" type so as to obtain a message M.

The encoder 82 transmits to the transmission module 86 the message M resulting from the encoding of the piece of information Info_m, as well as the list L_m of the identifiers of the nodes associated with each of the combined pieces of information.

Finally, in step 230, the packet generation module 86 elaborates a packet P, the header of which corresponds to the list Lm and the useful payload portion of which corresponds to the message M.

The thereby generated packet is made available to the transmission module 26. The latter has the responsibility of sending (step 240) the packet to the transmission/reception means 40 so that a suitable signal is transmitted in the allowed frame by the module 26, during a randomly selected slot by the module 26.

The broadcasting device shown above allows optimization of the traffic of packets while increasing by coding the number of pieces of information per packet and by reducing via containment, the probability of collisions between packets.

Alternatively, the module 84 is able to place the encoder 82 in a mode for limiting the number of hops of a piece of information from the node, the source of this piece of information. In order to apply this alternative, the header of the messages should include, associated with each identifier of a node, the source of a piece of information, the number of times that this piece of information has been relayed, i.e. the number of hops from the first broadcasting of this piece of information on the network. The information table 72 is then modified in order to include an additional field corresponding to this number of hops. In this alternative, the receiving stage 60 is adapted so as to update this new field of the table 72 with data contained in a received packet. If the same piece of information reaches the relevant node via different paths, the smaller number of hops is retained in the information table 72. The encoder 82 is therefore able to select the information table 72 for which the number of hops is less than a threshold hop number, for example with a value of 3. This operating variable is advantageously determined by the strategy module 84: its value is increased when the estimated number of neighboring nodes is low and reduced when the estimated number of neighboring nodes is large.

Thus, the synergy between the MAC layer and the coding layer allows optimization of the operating point of the network. It thus allows operation of the network with very high node densities, greater than those of the state of the art.

What is claimed is:

1. A node of a multi-hop ad-hoc radio network, the multi-hop ad-hoc radio network applying an information broadcasting service of a flooding type, according to which the node broadcasts data packets to all of neighboring nodes thereof, said node comprising:
    a controller accessing a radio resource by performing a dynamic containment for accessing the radio resource, wherein according to the dynamic containment the access to the radio resource being subdivided into time frames, wherein the node is allowed to access the radio resource every Q time frames, wherein a value of integer Q being variable and dynamically adapted according to a use of the radio resource made by the node and neighboring nodes thereof, said controller including a reception module, a collision reduction module and a transmission module, wherein:
        the reception module extracts parameters relating to the radio resource and to a quality of data packets received from a radio receiver of the node;
        the collision reduction module collects the parameters delivered by the reception module, computes the value of integer Q, and calls upon the transmission module at the beginning of the time frame in which the node is allowed to transmit; and
        the transmission module selects randomly a slot of the time frame in which a data packet is to be transmitted, and passes on the data packet to a radio transmitter of the node;
    a network coder including a storage stage containing information to be broadcast, and a transmission stage, the transmission stage preparing and generating data packets so that each packet includes, in a payload portion thereof, a message resulting from a combination of a plurality of pieces of information to be broadcast, and, in a header portion thereof, a list of identifiers of each piece of information combined in said message, the transmission stage including a strategy selection module, an encoding module and a packet generation module, wherein:
the strategy selection module selects a strategy defining how the encoding module selects the plurality of pieces of information;
the encoding module selects the plurality of pieces of information from the storage stage and generates the message by combining the plurality of pieces of information selected according to the strategy selected by the strategy selection module; and
the packet generation module generates a data packet from the message generated by the encoding module;
wherein the collision reduction module further passes at least one operating parameter on to the strategy selection module, the strategy being selected based on the at least one operating parameter; the collision reduction module thus controlling the network coder in the generation of the data packets.

2. The node according to claim 1, wherein the network coder comprises a receiving stage receiving data packets from the reception module of the controller, decoding the messages contained in the data packets received so as to update the plurality of pieces of information to be broadcast, wherein pieces of information are stored in the storage stage.

3. The node according to claim 2, wherein the receiving stage includes a reception module, a matrix reduction module and a decoding module.

4. The node according to claim 2, wherein the storage stage includes an information table, and a matrix associated with a table of messages.

5. The node according to claim 4, wherein the encoding module in the transmission stage of the network coder generates a message by linear combination of pieces of information selected in the information table.

6. The node according to claim 4, wherein the encoding module randomly selects the pieces of information to be combined in the information table.

7. The node according to claim 1, wherein said at least one operating parameter passed by the collision reduction module on to the strategy selection module is an estimated number of neighboring nodes.

8. A method for broadcasting information in a multi-hop ad-hoc radio network by applying an information broadcasting service of a flooding type at a node of the multi-hop ad-hoc radio network, the method comprising:
selecting a strategy for encoding a plurality of pieces of information stored by the node and to be broadcast;
encoding, in a message, all or part of the pieces of information stored, based on the strategy selected;
generating a data packet which includes, in a payload portion thereof, said message, and in a header portion thereof, a list of identifiers of the pieces of information combined in said message; and
transmitting the data packet generated by applying a dynamic containment process for accessing a radio resource, wherein according to the dynamic containment process, the access to the radio resource being subdivided into time frames, wherein the node is allowed to access the radio resource every Q time frames, a value of integer Q being variable and dynamically adapted according to a use of the radio resource made by the node and neighboring nodes thereof, said dynamic containment process including, at a node of the multi-hop ad-hoc radio network:
extracting parameters relating to the radio resource and to a quality of data packets received from a radio receiver of the node;
collecting the parameters extracted, computing the value of integer Q; and at the beginning of the time frame in which the node is allowed to transmit;
selecting randomly a slot of the time frame in which a data packet is to be transmitted, and passing the data packet to a radio transmitter of the node; wherein the method further includes, during the dynamic containment process, determining at least one operating parameters relating to the radio resource and to a quality of data packets received from a radio receiver of the node, and wherein the step of selecting a strategy includes selecting a strategy based on said at least one operating parameters.

* * * * *